United States Patent
Kim et al.

(10) Patent No.: US 11,005,098 B2
(45) Date of Patent: May 11, 2021

(54) METHOD OF PREPARING LITHIUM METAL OXIDE AND METHOD OF MANUFACTURING LITHIUM SECONDARY BATTERY

(71) Applicant: SK INNOVATION CO., LTD., Seoul (KR)

(72) Inventors: Jik Soo Kim, Daejeon (KR); Mi Jung Noh, Daejeon (KR); Kook Hyun Han, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 252 days.

(21) Appl. No.: 16/250,783

(22) Filed: Jan. 17, 2019

(65) Prior Publication Data
US 2019/0221844 A1    Jul. 18, 2019

(30) Foreign Application Priority Data

Jan. 17, 2018    (KR) .................. 10-2018-0005842
May 9, 2018    (KR) .................. 10-2018-0053311

(51) Int. Cl.
*H01M 4/505*    (2010.01)
*C01G 53/00*    (2006.01)
(Continued)

(52) U.S. Cl.
CPC .............. *H01M 4/505* (2013.01); *B08B 3/08* (2013.01); *C01G 53/42* (2013.01); *C01G 53/50* (2013.01);
(Continued)

(58) Field of Classification Search
CPC .......... B08B 3/08; C01G 53/42; C01G 53/50; C01P 2002/01; C01P 2002/52; C01P 2002/54; C01P 2004/04; C01P 2006/40; H01M 10/0525; H01M 10/058; H01M 2004/028; H01M 4/0404; H01M 4/1391; H01M 4/505; H01M 4/525
See application file for complete search history.

(56) References Cited

U.S. PATENT DOCUMENTS

2012/0231351 A1*   9/2012   Jung ............... H01M 4/131
                                                        429/341
2015/0344825 A1*   12/2015  Cooper ............ C11D 7/08
                                                        510/175

FOREIGN PATENT DOCUMENTS

CN    105355903    2/2016
CN    104779365    1/2017
(Continued)

OTHER PUBLICATIONS

Cho et al., Positive Active Material for a Lithium Secondary Battery, Method of Preparing thereof, and Lithium Secondary Battery Coprising the Same, Apr. 14, 2008, WIPO machine translation (Year: 2008).*

(Continued)

*Primary Examiner* — Adam A Arciero
(74) *Attorney, Agent, or Firm* — IP & T Group LLP

(57) ABSTRACT

In a method of preparing a lithium metal oxide, a preliminary lithium metal oxide is prepared. The preliminary lithium metal oxide is washed using a washing solution to (Continued)

remove lithium salt impurities. The washing solution includes water and an organic ligand multimer compound. The lithium metal oxide having improved structural uniformity and stability is obtained using the washing solution.

10 Claims, 5 Drawing Sheets

(51) Int. Cl.
*H01M 4/525* (2010.01)
*H01M 10/0525* (2010.01)
*B08B 3/08* (2006.01)
*H01M 4/04* (2006.01)
*H01M 4/1391* (2010.01)
*H01M 10/058* (2010.01)
*H01M 4/02* (2006.01)

(52) U.S. Cl.
CPC ....... *H01M 4/0404* (2013.01); *H01M 4/1391* (2013.01); *H01M 4/525* (2013.01); *H01M 10/058* (2013.01); *H01M 10/0525* (2013.01); *C01P 2002/01* (2013.01); *C01P 2002/52* (2013.01); *C01P 2002/54* (2013.01); *C01P 2004/04* (2013.01); *C01P 2006/40* (2013.01); *H01M 2004/028* (2013.01)

(56) References Cited

FOREIGN PATENT DOCUMENTS

| | | |
|---|---|---|
| EP | 0864539 | 9/1998 |
| JP | 2000082468 | 3/2000 |
| JP | 2001006678 | 1/2001 |
| JP | 2002203549 | 7/2002 |
| JP | 2010006678 | 1/2010 |
| KR | 100821523 | 4/2008 |
| KR | 1020140081741 | 7/2014 |
| KR | 1020150047052 | 5/2015 |
| KR | 10-2015-0092276 | 8/2015 |
| KR | 101718668 | 3/2017 |
| KR | 1020170084995 | 7/2017 |
| KR | 101815998 | 1/2018 |

OTHER PUBLICATIONS

Extended Search Report Issued by European Patent office dated May 21, 2019.

* cited by examiner

METHOD OF PREPARING LITHIUM METAL OXIDE AND METHOD OF MANUFACTURING LITHIUM SECONDARY BATTERY

CROSS-REFERENCE TO RELATED APPLICATION AND CLAIM OF PRIORITY

This application claims priority to Korean Patent Applications No. 10-2018-0005842 filed on Jan. 17, 2018, and No. 10-2018-0053311 filed on May 9, 2018 in the Korean Intellectual Property Office (KIPO), the entire disclosure of which is incorporated by reference herein.

BACKGROUND

1. Field

The present invention relates to a method of preparing a lithium metal oxide and a method of manufacturing a lithium secondary battery. More particularly, the present invention relates to a method of preparing a lithium metal oxide and a method of manufacturing a lithium secondary battery using the lithium metal oxide as an active material.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

A lithium metal oxide may be used as a cathode active material of the lithium secondary battery. The lithium metal oxide may include a nickel-based lithium metal oxide.

As an application range of the lithium secondary battery is becoming expanded, more improved life-span, capacity and operational stability are required. When chemical irregularity of the lithium metal oxide as the cathode active material is caused by a lithium precipitation, the lithium secondary battery having desired capacity and life-span may not be achieved.

For example, Korean Registered Patent Publication No. 10-0821523 discloses a method of removing lithium salt impurities by washing with water. However, the impurities may not be sufficiently removed, and surface damages of particles may be caused during the washing process.

SUMMARY

According to an aspect of the present invention, there is provided a method of preparing a lithium metal oxide having improved operational stability and electrical property.

According to an aspect of the present invention, there is provided a method of manufacturing a lithium secondary battery having improved operational stability and electrical property.

In a method of preparing a lithium metal oxide according to exemplary embodiments, a preliminary lithium metal oxide is prepared. The preliminary lithium metal oxide is washed using a washing solution to remove lithium salt impurities, the washing solution including water and an organic ligand multimer compound.

In some embodiments, the organic ligand multimer compound may include at least one element having at least one unshared electron pair In some embodiments, the element having the unshared electron pair may form a coordination bond or an ionic bond with lithium or a metal element except for lithium of the preliminary lithium metal oxide.

In some embodiments, the organic ligand multimer compound may include at least two different elements having the unshared electron pair.

In some embodiments, wherein the organic ligand multimer compound may include sulfur (S) and oxygen (O), or includes sulfur (S) and nitrogen (N).

In some embodiments, the organic ligand multimer compound may include at least one of a heteroaryl group or a heteroallyl group.

In some embodiments, an amount of the organic ligand multimer compound may be in a range from 0.05 part by weight to 2.5 parts by weight based on 1 part by weight of LiOH in the lithium salt impurities.

In some embodiments, a remaining amount of the organic ligand multimer compound may be in a range from 0.0005 wt % to 0.5 wt % based on a weight of the lithium metal oxide.

In some embodiments, the lithium metal oxide may be represented by Chemical Formula 1.

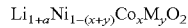
$$Li_{1+a}Ni_{1-(x+y)}Co_xM_yO_2 \quad \text{[Chemical Formula 1]}$$

In Chemical Formula 1, $-0.05 \leq a \leq 0.15$, $0.01 \leq x \leq 0.2$, $0 \leq y \leq 0.2$, and M may be at least one selected from Mg, Sr, Ba, B, Al, Si, Mn, Ti, Zr or W.

In some embodiments, the lithium metal oxide may include a metal oxide coating formed on at least a portion of a surface thereof.

In a method of manufacturing a lithium secondary battery according to exemplary embodiments, a cathode active material including the lithium metal oxide prepared according to exemplary embodiments is formed. The cathode active material is coated on a cathode current collector to from a cathode. An anode facing the cathode with respect to a separation layer is formed.

According to exemplary embodiments, a preliminary lithium metal oxide may be washed using a washing solution that includes an organic ligand multimer compound mixed in a pure water. The organic ligand multimer compound may be coordinated with lithium or a metal included in the preliminary lithium metal oxide to form a complex.

Thus, lithium salt impurities may be easily removed using the organic ligand multimer compound and the pure water while protecting lithium and metal elements of the preliminary lithium metal oxide from being decomposed in water.

Therefore, reduction of lithium ion mobility and capacity by the lithium salt impurities may be prevented, and a structure of the lithium metal oxide at a surface thereof may be maintained so that life-span of a lithium secondary battery may be improved.

DETAILED DESCRIPTION OF THE EMBODIMENTS

Figure 1:
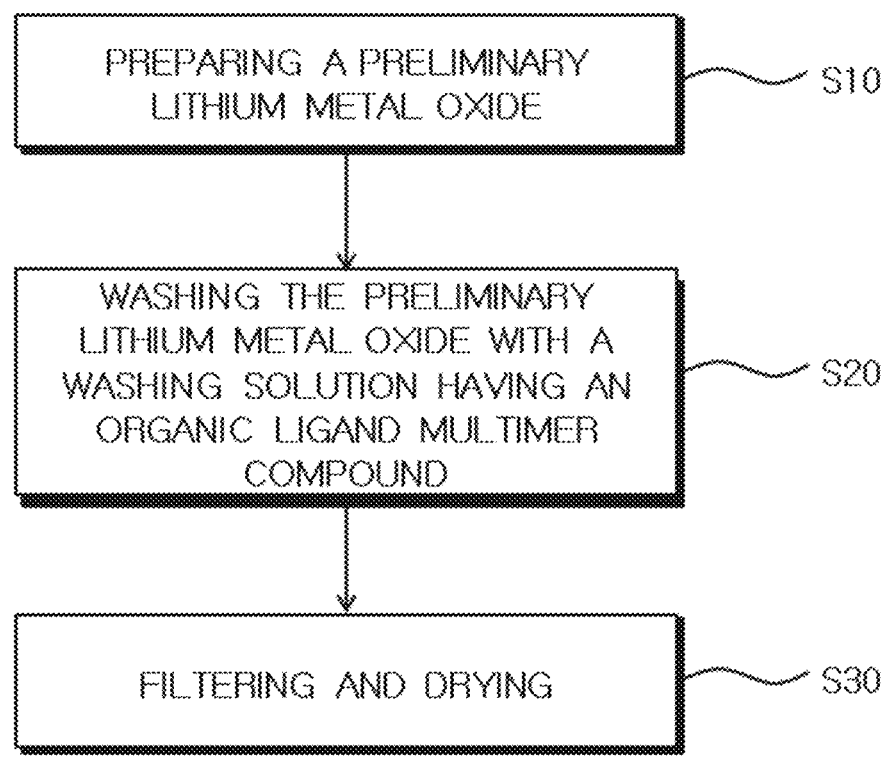
FIG. 1 is a flowchart describing a method of preparing a lithium metal oxide in accordance with exemplary embodiments.

According to example embodiments of the present invention, in a method of preparing a lithium metal oxide, a preliminary lithium metal oxide may be washed by a washing solution that may include an organic ligand multimer compound mixed in water so that lithium salt impurities may be removed, and the lithium metal oxide having improved uniformity and stability may be obtained. Further, methods of manufacturing a cathode active material and a lithium secondary battery which include the lithium metal oxide and have improved capacity and life-span are also provided.

Hereinafter, the present invention will be described in detail with reference to some embodiments and the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The term "lithium metal oxide" used herein indicates a complex oxide containing lithium and at least one metal except for lithium. In exemplary embodiments, the lithium metal oxide may include a nickel-based lithium oxide.

For example, the nickel-based lithium oxide may be represented by Chemical Formula 1 below.

$Li_{1+a}Ni_{1-(x+y)}Co_xM_yO_2$      [Chemical Formula 1]

In Chemical Formula 1, $-0.05 \leq a \leq 0.15$, $0.01 \leq x \leq 0.2$, $0 \leq y \leq 0.2$, and M may be at least one selected from Mg, Sr, Ba, B, Al, Si, Mn, Ti, Zr or W. In an embodiment, $0.01 \leq y \leq 0.15$.

In some embodiments, the lithium metal oxide may be represented by Chemical Formula 2 below.

$Li_{1+a}Ni_bCo_xM_yO_2$      [Chemical Formula 2]

In the Chemical Formula 2 above, M may include at least one of Mn, Al, Zr, Ti or B. Here, $-0.05 \leq a \leq 0.15$, $0.8 \leq b < 1$, $0.01 \leq x \leq 0.2$, $0 \leq y \leq 0.2$, and $0.98 \leq b+x+y \leq 1.02$ In exemplary embodiments, a preliminary lithium metal oxide particle may be coated by a metal oxide or the like so that a coating (or a coating layer) may be formed thereon. The metal oxide may include $Al_2O_3$, $ZrO_2$, $Co_3O_4$ and/or $TiO_2$. A structural stability of the lithium metal oxide may be achieved by the coating layer, and a life-span of the battery may be also increased. Further, lithium residues or lithium impurities created on the coating layer may be effectively washed or removed by a washing solution including an organic ligand multimer compound and water, and thus a surface protection may be also provided.

In exemplary embodiments, the lithium metal oxide may be used as a cathode active material of the lithium secondary battery. For example, in the Chemical Formula 1 above, nickel (Ni) may serve as a metal related to a capacity of the lithium secondary battery. As an amount of nickel becomes higher, capacity and power of the lithium secondary battery may be improved. However, an excessive amount of nickel may degrade life-span of the battery, and may be disadvantageous in an aspect of mechanical and electrical stability of the battery. For example, cobalt (Co) may serve as a metal related to conductivity or resistance of the lithium secondary battery. In an embodiment, M may include manganese (Mn) and may serve as a metal related to the mechanical and electrical stability of the lithium secondary battery In exemplary embodiments, the lithium metal oxide may include a nickel-cobalt-manganese based compound so that the cathode active material having improved capacity, power, low resistance and life-span stability may be provided.

FIG. 1 is a flowchart describing a method of preparing a lithium metal oxide in accordance with exemplary embodiments.

In exemplary embodiments, a preliminary lithium metal oxide may be prepared (e.g., in an operation of S10).

The preliminary lithium metal oxide may include a nickel-based lithium oxide. For example, a lithium precursor and a nickel precursor may be reacted with each other to from the preliminary lithium metal oxide. The lithium precursor and the nickel precursor may include an oxide or a hydroxide of lithium and nickel, respectively. For example, the lithium precursor and the nickel precursor may be reacted in a solution via a co-precipitation to obtain the preliminary lithium metal oxide.

In some embodiments, another metal precursor (e.g., a cobalt precursor, a manganese precursor) may be further reacted with the lithium precursor and the nickel precursor. In this case, the preliminary lithium metal oxide having a total composition of Chemical Formula 1 may be obtained. In some embodiments, the lithium precursor and a nickel-cobalt-manganese precursor (e.g., a nickel-cobalt-manganese hydroxide) may be used.

After the reaction of the precursors, a drying process may be performed to remove a remaining solution and collect the preliminary lithium metal oxide.

In some embodiments, an annealing process or a firing process may be performed after synthesizing the preliminary lithium metal oxide. For example, the annealing or firing process may be performed at a temperature in a range from about 600° C. to about 800° C. In an embodiment, a temperature may be increased to a target firing temperature by a predetermined temperature increase rate (e.g., a temperature increase period), and then the firing process may be performed for about 6 to about 12 hours (e.g., a temperature maintaining period).

Metals precipitated on a surface of the preliminary lithium metal oxide may be oxidized again by the firing process, and merged with or re-synthesized into an inside of the preliminary lithium metal oxide as an oxide.

In some embodiments, the firing process may be performed in an oxidizing atmosphere. For example, oxygen may be provided by a predetermined flow rate for the temperature increase period and/or the temperature maintaining period into a firing chamber in which the preliminary lithium metal oxide is loaded.

The prepared preliminary lithium metal oxide may be washed using a washing solution that may include an organic ligand multimer compound mixed in water, e.g., pure water so that lithium salt impurities may be removed (e.g., in an operation of S20).

The term "lithium salt impurities" used herein may indicate residues on a surface of the lithium metal oxide during a formation of the lithium metal oxide, and may include non-reacted precursors and byproducts containing a lithium cation. The lithium salt impurities may include lithium salts combined with an anion such as a hydroxide ion, a carbonate ion, and may include, e.g., lithium hydroxide (LiOH), lithium carbonate ($Li_2CO_3$) or lithium oxide ($Li_2O$).

For example, non-reacted precursors may be remained on the surface of the preliminary metal oxide synthesized by the solution-based reaction. Impurities generated from the synthesis and solution molecules may be also remained on the surface of the preliminary lithium metal oxide. For example, lithium salt impurities may be generated to cause gelation when forming a slurry for preparing a cathode active material of a lithium secondary battery. The lithium salt impurities may be reacted with an electrolyte of the lithium secondary battery to create gas, and thus life-span and storage stability of the battery may be degraded.

In exemplary embodiments, the washing solution may include water, e.g., distilled water or deionized water.

The lithium impurities may be highly soluble in water, and thus may be substantially removed by being dissolved in water.

In exemplary embodiments, a weight ratio of water relative to the preliminary lithium metal oxide may be in a range from about 1 to about 3 in the washing process. If the weight ratio of water is less than about 1, the preliminary metal oxide may not be easily dispersed in the washing solution, and the lithium salt impurities may not be sufficiently removed. If the weight ratio of water exceeds about 3, lithium in the preliminary metal oxide may be oxidized, thereby to be damaged or partially removed.

In some embodiments, water may be bubbled or purged by an inert gas (e.g., $N_2$) so that dissolved oxygen in water may be removed or reduced. Accordingly, surface residues on the surface of the preliminary metal oxide may be only removed and damages of a particle crystalline structure may be prevented.

When the washing process may be washed only ne water, lithium metal oxides distributed on a particle surface may be decomposed or transformed into lithium hydroxide (LiOH), lithium carbonate ($Li_2CO_3$), lithium oxide ($Li_2O$), nickel oxide (NiOx), etc. As a result, a lithium amount at the surface of the preliminary lithium metal oxide may be reduced to cause a reduction of capacity and average voltage of the lithium secondary battery.

Further, a lithium deficient region may be created on the particle surface to be provided as a barrier blocking a lithium ion transfer. Thus, a resistance in a cathode of the lithium secondary battery may be increased to degrade a battery operation.

The organic ligand multimer compound may prevent the preliminary metal oxide from being decomposed while washing the lithium salt impurities.

The term "multimer" used herein indicates a compound formed from a combination of at least two monomers. The multimer may include a dimer, a trimer, a tetramer, an oligomer and a polymer. For example, tetraethyl thiuram disulfide is a multimer (a dimer) of tetraethyl thiuram sulfide.

The multimer may be partially decomposed or dissociated while being coordinated with the lithium metal oxide. Alternatively, the multimer may be coordinated with the lithium metal oxide without being decomposed or dissociated.

The organic ligand multimer may have a relatively large size and may include a plurality of coordination sites so that a surface protection of the lithium metal oxide may be effectively implemented.

The organic ligand multimer compound may be coordinated with lithium in the lithium salt impurities. Thus, the lithium salts impurities may be remove together with the washing solution.

The organic ligand multimer compound may be coordinated with lithium or metal elements in the preliminary lithium metal oxide so that the lithium or metal elements may be prevented from being reacted with water. For example, the lithium or metal elements may be surrounded by the organic ligand multimer compound having a relatively large size to be prevented from being interacted with water.

Thus, the organic ligand multimer compound may be used together with water so that the lithium salt impurities may be effectively washed while preventing the preliminary lithium metal oxide from being decomposed into lithium hydroxide or lithium carbonate via a reaction with water. Accordingly, a surface structure of the preliminary lithium metal oxide may be stabilized to enhance life-span of the lithium secondary battery.

In exemplary embodiments, the washing solution may be prepared by dissolving the organic ligand multimer compound in water, and an organic solvent may not be included in the washing solution. If the organic solvent is used, water and the organic solvent may be converted into a homogenous mixture or an emulsion.

Further, when the washing solution includes the organic solvent, an interaction or contact possibility between water and the lithium salt impurities may be hindered or reduced to cause a reduction of washing capability or efficiency. The organic solvent may be also hazardous to human or environment, and thus an additional separation process or equipment is required.

In some embodiments, the organic ligand multimer compound may include at least one element having an unshared electron pair, e.g., nitrogen (N), oxygen (O) and/or sulfur (S).

In some embodiments, the element having the non-shared electron pair may form a coordination bond or an ionic bond with lithium or a metal element except for lithium of the preliminary lithium metal oxide. The element having the non-shared electron pair may also form a coordinate covalent bond or an ionic bond with lithium in the lithium salt impurities. Thus, the lithium salt impurities may be washed together with the organic ligand multimer compound.

When the organic ligand multimer compound is combined with the preliminary lithium metal oxide, the non-shared electron pair may be provided with lithium or the metal element in the preliminary lithium metal oxide to form the coordination bond.

In exemplary embodiments, the metal element in the preliminary lithium metal oxide may include a metal of Group IV or more such as Sr, Ba, Mn, Ti, Zr or W. In an embodiment, the element having the non-shared electron pair may preferably include sulfur (S). In this case, sulfur (S) may easily donate electrons to a vacant d-orbital in the metal element to form a strong coordination bond. Thus, a surface protection of the lithium metal oxide may be more effectively implemented.

In an embodiment, the element having the non-shared electron pair may include nitrogen (N) which may donate electrons to the metal element of the lithium metal oxide more easily than oxygen (O).

In some embodiments, the organic ligand multimer compound may at least two elements having the non-shared electron pair.

For example, if the organic ligand multimer compound includes a plurality of elements having the non-shared electron pair, every non-shared electron pair may serve as a coordination site to form the coordination bond. The non-shared electron pairs may be coordinated (chelated) with the same metal element or different metal elements.

Lithium in the lithium salt impurities may be chelated by a plurality of the coordination sites to be separated from lithium salts. Thus, the lithium salt impurities may be dissociated and removed.

The organic ligand multimer compound may be chelated with lithium or the metal element in the preliminary lithium metal oxide. For example, one or more of the coordination sites may be coordinated with lithium, and other sites may be coordinated with the metal element. Accordingly, lithium and the metal element may be prevented from being reacted with water so that the surface structure of the lithium metal oxide may be substantially maintained.

In some embodiments, the organic ligand multimer compound may include at least two of N, O and S as the element having the non-shared electron pair. For example, the organic ligand multimer compound may include N and O, N and S, or O and S. Preferably, the organic ligand multimer compound may include O and S, or N and S from an aspect of an electron donation tendency. More preferably, the organic ligand multimer compound may include N and S.

In some embodiments, the organic ligand multimer compound may include at least one of a heteroaryl group or a heteroallyl group.

A hetero element in the heteroaryl group or the heteroallyl group may include sufficient electrons due to aromatic or allyl characteristics so that electrons may be donated to the metal element more efficiently to form the coordination bond. Thus, the removal of the lithium salt impurities and the surface protection of the lithium metal oxide may be more effectively implemented.

Non-limiting examples of the organic ligand multimer compound may include tetraethyl thiuram disulfide, 2,2'-dithiodiethanol, dithiodiglycolic acid, 2,5-dimercapto-1,3,4-thiadiazole dimer, dimercapto dithiazole polymer, 2,4-dithiopyrimidine polymer, piperazine polymer, tetrathioethylenediamine polymer, trithiocyanuric acid polymer, dimethyl dithioethylenediamine polymer, etc.

In some embodiments, an amount of the organic ligand multimer compound may be in a range from 0.05 part by weight to 2.5 parts by weight relative to one part by weight of the lithium salt impurities. For example, the amount of the organic ligand multimer compound may be in a range from 0.05 part by weight to 2.5 parts by weight based on one part by weight of LiOH. If the amount of the organic ligand multimer compound is less than about 0.05 part by weight, the organic ligand multimer compound may form a complex with lithium dissociated from the lithium salt impurities in advance to degrade the protection of the preliminary lithium metal oxide. If the amount of the organic ligand multimer compound exceeds about 2.5 parts by weight, the organic ligand multimer compound may remain on the lithium metal oxide after the washing process to deteriorate a battery operation. Further, the organic ligand multimer compound may be reacted with lithium during a drying process to create lithium carbonate.

The washing process may be performed for about 10 minutes to about 1 hour together with stirring from an aspect of washing efficiency and prevention of internal damages. The washing process may be performed in a nitrogen atmosphere to maintain a non-oxidizing atmosphere.

In exemplary embodiments, a remaining amount of the organic ligand multimer compound after the washing may be in a range from 0.0005 wt %/o to 0.5 wt % relative to a weight of the lithium metal oxide. If the remaining amount of the organic ligand multimer compound is less than about 0.0005 wt %, a sufficient surface protection may not be achieved due to an insufficient initial amount of the organic ligand multimer compound. If the remaining amount of the organic ligand multimer compound exceeds about 0.5 wt %, the remaining organic ligand multimer compound may be reacted with lithium of the lithium metal oxide during the drying process to regenerate the lithium salt impurities such as lithium carbonate and degrade capacity and life-span of the battery.

In some embodiments, the preliminary lithium metal oxide may be filtered and dried after the washing process (e.g., in an operation of S30). A filtering method commonly known in the related art may be used. For example, a vacuum filtration using Buchner funnel may be employed.

A drying method commonly known in the related art may be used. For example, a vacuum heating may be used. A heating temperature may be in a range from about 100° C. to about 300° C. for enhancing a stability of the lithium metal oxide.

Figure 2:
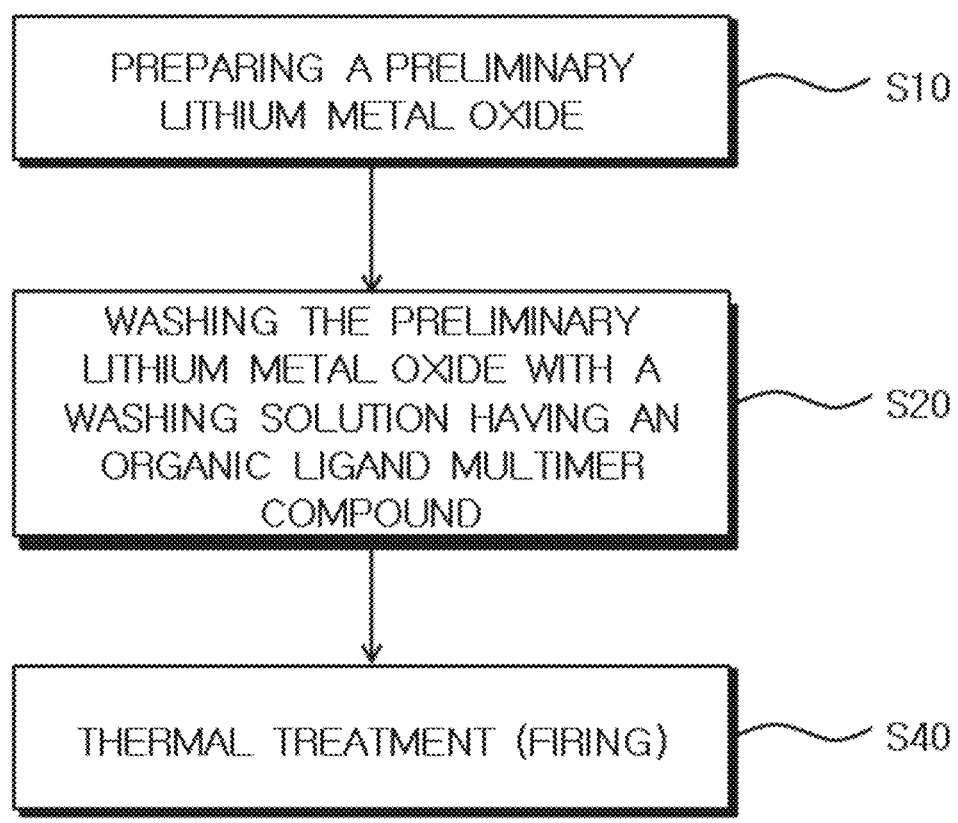
FIG. 2 is a flowchart describing a method of preparing a lithium metal oxide in accordance with some exemplary embodiments.

FIG. 2 is a flowchart describing a method of preparing a lithium metal oxide in accordance with some exemplary embodiments. Detailed descriptions substantially the same as or similar to those described with reference to FIG. 1 are omitted herein Referring to FIG. 2, a thermal treatment (e.g., a firing process) may be performed instead of the drying process (e.g., in an operation of S40).

In this case, the lithium salt impurities remaining on the surface of the lithium metal oxide that may not be removed by the washing process may be merged again into the lithium metal oxide.

For example, the firing process may be performed at a temperature in a range from about 600° C. to about 800° C., and may include a temperature increase period and a temperature maintaining period. In some embodiments, the firing process may be performed in an oxidizing atmosphere.

After the firing process in the temperature maintaining period, a cooling at a room temperature may be performed to obtain the lithium metal oxide having desired composition and property.

According to exemplary embodiments, a method of manufacturing a cathode active material or a lithium secondary battery utilizing the method of preparing the lithium metal oxide is also provided.

Figure 3:
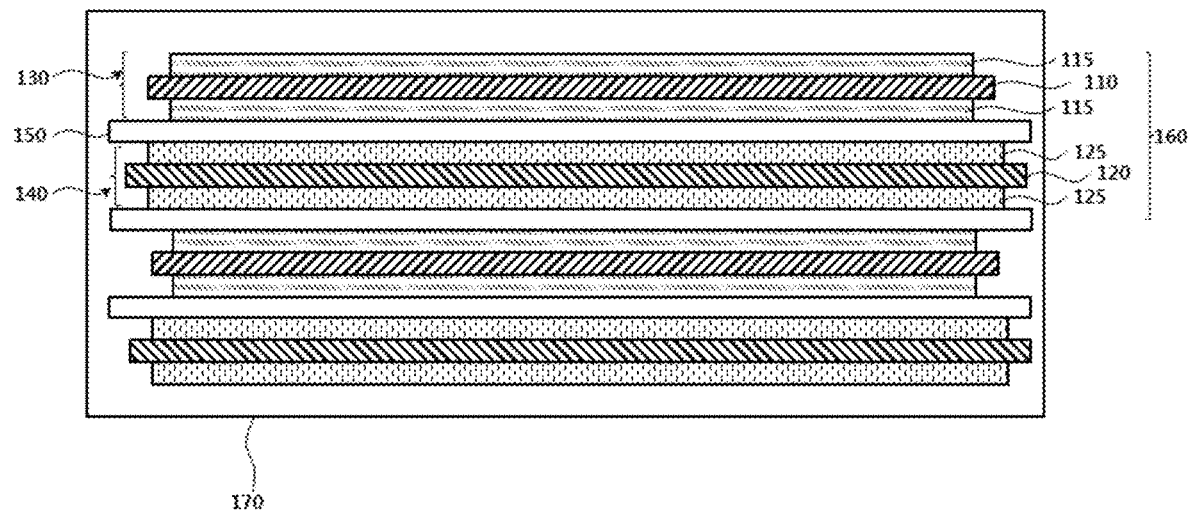
FIG. 3 is a schematic cross-sectional view illustrating a lithium secondary battery in accordance with example embodiments.

FIG. 3 is a schematic cross-sectional view illustrating a lithium secondary battery in accordance with example embodiments.

Referring to FIG. 3, a lithium secondary battery may include a cathode 130, an anode 140 and a separation layer 150 interposed therebetween.

The cathode 130 may include a cathode active material layer 115 formed by coating a cathode active material on a cathode current collector 110. In exemplary embodiments, the cathode active material may be prepared using the lithium metal oxide obtained by processes as described with reference to FIG. 1 or FIG. 2.

For example, the lithium metal oxide may be mixed and stirred together with a binder, a conductive additive and/or a dispersing agent in a solvent to form a slurry. The slurry may be coated on the cathode current collector 110, and pressed and dried to obtain the cathode 130.

The cathode current collector 110 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 115 may be reduced, and an amount of the cathode active material may be relatively increased. Thus, capacity and power output of the lithium secondary battery may be further improved.

The conductive additive may be added to facilitate an electron mobility between the active material particles. For example, the conductive additive may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

In example embodiments, the anode 140 may include an anode current collector 120 and an anode active material layer 125 formed by coating an anode active material on the anode current collector 120.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), etc. The crystalline carbon may include a graphite-based material, such as natural graphite, graphitized cokes, graphitized MCMB, graphitized MPCF, etc. The lithium alloy may further include aluminum, zinc, bismuth, cadmium, antimony, silicon, lead, tin, gallium, or indium.

The anode current collector 120 may include gold, stainless-steel, nickel, aluminum, titanium, copper or an alloy thereof, preferably, may include copper or a copper alloy.

In some embodiments, the anode active material may be mixed and stirred together with a binder, a conductive additive and/or a dispersing agent in a solvent to form a slurry. The slurry may be coated on the anode current collector 120, and pressed and dried to obtain the anode 140.

The binder and the conductive additive substantially the same as or similar to those as mentioned above may be used. In some embodiments, the binder for the anode 140 may include an aqueous binder such as such as styrene-butadiene rubber (SBR) that may be used with a thickener such as carboxymethyl cellulose (CMC) so that compatibility with the carbon-based active material may be improved.

The separation layer 150 may be interposed between the cathode 130 and the anode 140. The separation layer 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 150 may be also formed from a non-woven fabric including a glass fiber with a high melting point, a polyethylene terephthalate fiber, or the like.

In some embodiments, an area and/or a volume of the anode 140 (e.g., a contact area with the separation layer 150) may be greater than that of the cathode 130. Thus, lithium ions generated from the cathode 130 may be easily transferred to the anode 140 without loss by, e.g., precipitation or sedimentation. Therefore, the enhancement of power and stability by the removal of the lithium salt impurities may be effectively implemented.

In example embodiments, an electrode cell 160 may be defined by the cathode 130, the anode 140 and the separation layer 150, and a plurality of the electrode cells 160 may be stacked to form an electrode assembly having, e.g., a jelly roll shape. For example, the electrode assembly may be formed by winding, laminating or folding of the separation layer 150.

The electrode assembly may be accommodated in an outer case 170 together with an electrolyte to form the lithium secondary battery. In example embodiments, the electrolyte may include a non-aqueous electrolyte solution.

The non-aqueous electrolyte solution may include a lithium salt and an organic solvent. The lithium salt may be represented by $Li^+X^-$, and an anion of the lithium salt $X^-$ may include, e.g., $F^-$, $C^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

An electrode tab may be formed from each of the cathode current collector 110 and the anode current collector 120 to extend to one end of the outer case 170. The electrode tabs may be welded together with the one end of the outer case 170 to form an electrode lead exposed at an outside of the outer case 170.

The lithium secondary battery may be fabricated into a cylindrical shape using a can, a prismatic shape, a pouch shape, a coin shape, etc.

For example, the lithium secondary battery as illustrated in FIG. 3 may be obtained by the above-described processes. The cathode active material layer 115 of the lithium secondary battery may include the lithium metal oxide from which the lithium salt impurities may be substantially removed, and thus may have high reliability.

Thus, the lithium secondary battery having enhanced life-span and long-term stability may be achieved while preventing a reduction of capacity and average voltage by the lithium salt impurities.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims

Examples and Comparative Examples

Nickel-based lithium oxides having a composition of Li[Ni$_{0.88}$Co$_{0.09}$Mn$_{0.03}$]O$_2$ or Li[Ni$_{0.8}$Co$_{0.1}$Mn$_{0.1}$]O2 were used as a preliminary lithium metal oxide. Deionized water (DIW) having a specific resistance less than 25 MΩcm was used in a washing process.

Examples 1

1 kg of deionized water was put in a 2 L reactor and bubbled for 30 minutes using nitrogen to sufficiently remove dissolved oxygen. Organic ligand multimer compounds were put as shown in Table 1 relative to 1 part by weight of remaining LiOH and stirred for 30 minutes. 1 kg of the nickel-based lithium metal oxide (Li[Ni$_{0.88}$Co$_{0.09}$Mn$_{0.03}$]O$_2$) was put and further stirred for 30 minutes at 300 rpm in a nitrogen atmosphere. The resultant mixture was vacuum-filtered using Buchner funnel. A filtered lithium metal oxide was dried for 24 hours at a temperature in a range from 200° C. to 300° C. in vacuum, and classified using 325 mesh to obtain a washed nickel-based lithium metal oxide.

Example 2

Lithium metal oxides were prepared by the method the same as that of Examples 1 except that the organic ligand multimer compounds as shown in Table 1 were used.

Example 3

Lithium metal oxides were prepared by the method the same as that of Examples 1 except that a surface coating was formed using metal oxides by amounts (wt % relative to a weight of the lithium metal oxide) as shown in Table 1.

Example 4

Lithium metal oxides were prepared by the method the same as that of Examples 3 except that organic ligand dimer compounds as shown in Table 1 were used.

Example 5

Nickel-based lithium metal oxides were prepared by the method the same as that of Examples 3 except that Li[Ni$_{0.8}$Co$_{0.1}$Mn$_{0.1}$]O$_2$ was used as a lithium metal oxide and organic ligand multimer compounds as shown in Table 1 were used.

Example 6

Nickel-based lithium metal oxides were prepared by the method the same as that of Examples 5 except that organic ligand polymer compounds as shown in Table 1 were used.

Comparative Examples 1 and 2

Lithium metal oxides were prepared by the method the same as that of Examples 1 and 5 except that the washing process was performed using only water without the organic ligand multimer compound.

Comparative Example 3

Nickel-based lithium metal oxides were prepared by the method the same as that of Example 1 except that organic ligand monomer compounds as shown in Table 1 were used.

Comparative Example 4

Nickel-based lithium metal oxides were prepared by the method the same as that of Example 5 except that organic ligand monomer compounds as shown in Table 1 were used.

TABLE 1

| 구분 | Lithium Metal Oxide | Coating wt % | | | Organic Ligand Compound | wt % |
| --- | --- | --- | --- | --- | --- | --- |
| | | Al$_2$O$_3$ | ZrO$_2$ | TiO$_2$ | | |
| Example 1-1 | Li[Ni$_{0.88}$Co$_{0.09}$Mn$_{0.03}$]O$_2$ | | | | tetraethyl thiuram disulfide | 1.0 |
| Example 1-2 | Li[Ni$_{0.88}$Co$_{0.09}$Mn$_{0.03}$]O$_2$ | | | | 2,2'-Dithiodiethanol | 1.0 |
| Example 1-3 | Li[Ni$_{0.88}$Co$_{0.09}$Mn$_{0.03}$]O$_2$ | | | | Dithiodiglycolic Acid | 1.0 |
| Example 2-1 | Li[Ni$_{0.88}$Co$_{0.09}$Mn$_{0.03}$]O$_2$ | | | | 2,4-dithiopyrimidine polymer | 1.0 |
| Example 2-2 | Li[Ni$_{0.88}$Co$_{0.09}$Mn$_{0.03}$]O$_2$ | | | | Piperazine polymer | 1.0 |
| Example 2-3 | Li[Ni$_{0.88}$Co$_{0.09}$Mn$_{0.03}$]O$_2$ | | | | tetrathioethylenediamine polymer | 1.0 |
| Example 2-4 | Li[Ni$_{0.88}$Co$_{0.09}$Mn$_{0.03}$]O$_2$ | | | | trithiocyanuric acid polymer | 1.0 |
| Example 2-5 | Li[Ni$_{0.88}$Co$_{0.09}$Mn$_{0.03}$]O$_2$ | | | | dimethyl dithioethylenediamine polymer | 1.0 |
| Example 3-1 | Li[Ni$_{0.88}$Co$_{0.09}$Mn$_{0.03}$]O$_2$ | 0.5 | 0.06 | 0.2 | tetraethyl thiuram disulfide | 1.0 |
| Example 3-2 | Li[Ni$_{0.88}$Co$_{0.09}$Mn$_{0.03}$]O$_2$ | 0.5 | 0.06 | 0.2 | 2,2'-Dithiodiethanol | 1.0 |
| Example 3-3 | Li[Ni$_{0.88}$Co$_{0.09}$Mn$_{0.03}$]O$_2$ | 0.5 | 0.06 | 0.2 | Dithiodiglycolic Acid | 1.0 |
| Example 4-1 | Li[Ni$_{0.88}$Co$_{0.09}$Mn$_{0.03}$]O$_2$ | 0.5 | 0.06 | 0.2 | 2,2'-Dithiodiethanol | 0.5 |
| Example 4-2 | Li[Ni$_{0.88}$Co$_{0.09}$Mn$_{0.03}$]O$_2$ | 0.5 | 0.06 | 0.2 | Dithiodiglycolic Acid | 0.5 |
| Example 4-3 | Li[Ni$_{0.88}$Co$_{0.09}$Mn$_{0.03}$]O$_2$ | 0.5 | 0.06 | 0.2 | 2,5-dimercapto-1,3,4-thiadiazole Dimer | 0.5 |
| Example 4-4 | Li[Ni$_{0.88}$Co$_{0.09}$Mn$_{0.03}$]O$_2$ | 0.5 | 0.06 | 0.2 | 2,2'-Dithiodiethanol | 0.1 |
| Example 4-5 | Li[Ni$_{0.88}$Co$_{0.09}$Mn$_{0.03}$]O$_2$ | 0.5 | 0.06 | 0.2 | Dithiodiglycolic Acid | 0.1 |
| Example 5-1 | Li[Ni$_{0.8}$Co$_{0.1}$Mn$_{0.1}$]O$_2$ | 0.5 | 0.06 | 0.2 | tetraethyl thiuram disulfide | 0.5 |
| Example 5-2 | Li[Ni$_{0.8}$Co$_{0.1}$Mn$_{0.1}$]O$_2$ | 0.5 | 0.06 | 0.2 | 2,2'-Dithiodiethanol | 0.5 |
| Example 5-3 | Li[Ni$_{0.8}$Co$_{0.1}$Mn$_{0.1}$]O$_2$ | 0.5 | 0.06 | 0.2 | Dithiodiglycolic Acid | 0.5 |
| Example 5-4 | Li[Ni$_{0.8}$Co$_{0.1}$Mn$_{0.1}$]O$_2$ | 0.5 | 0.06 | 0.2 | 2,5-dimercapto-1,3,4-thiadiazole Dimer | 0.5 |
| Example 6-1 | Li[Ni$_{0.8}$Co$_{0.1}$Mn$_{0.1}$]O$_2$ | 0.5 | 0.06 | 0.2 | dimercapto dithiazole polymer | 0.5 |
| Example 6-2 | Li[Ni$_{0.8}$Co$_{0.1}$Mn$_{0.1}$]O$_2$ | 0.5 | 0.06 | 0.2 | 2,4-dithiopyrimidine polymer | 0.5 |
| Example 6-3 | Li[Ni$_{0.8}$Co$_{0.1}$Mn$_{0.1}$]O$_2$ | 0.5 | 0.06 | 0.2 | Piperazine polymer | 0.5 |
| Example 6-4 | Li[Ni$_{0.8}$Co$_{0.1}$Mn$_{0.1}$]O$_2$ | 0.5 | 0.06 | 0.2 | tetrathioethylenediamine polymer | 0.5 |
| Example 6-5 | Li[Ni$_{0.8}$Co$_{0.1}$Mn$_{0.1}$]O$_2$ | 0.5 | 0.06 | 0.2 | trithiocyanuric acid polymer | 0.5 |

TABLE 1-continued

| 구분 | Lithium Metal Oxide | Coating wt % | | | Organic Ligand Compound | wt % |
| --- | --- | --- | --- | --- | --- | --- |
| | | Al$_2$O$_3$ | ZrO$_2$ | TiO$_2$ | | |
| Example 6-6 | Li[Ni$_{0.8}$Co$_{0.1}$Mn$_{0.1}$]O$_2$ | 0.5 | 0.06 | 0.2 | dimethyl dithioethylenediamine polymer | 0.5 |
| Comparative Example 1 | Li[Ni$_{0.88}$Co$_{0.09}$Mn$_{0.03}$]O$_2$ | | | | — | — |
| Comparative Example 2 | Li[Ni$_{0.8}$Co$_{0.1}$Mn$_{0.1}$]O$_2$ | 0.5 | 0.06 | 0.2 | — | — |
| Comparative Example 3-1 | Li[Ni$_{0.88}$Co$_{0.09}$Mn$_{0.03}$]O$_2$ | | | | Tetraethylthiuram sulfide | 1.0 |
| Comparative Example 3-2 | Li[Ni$_{0.88}$Co$_{0.09}$Mn$_{0.03}$]O$_2$ | | | | 2-thioethanol | 1.0 |
| Comparative Example 3-3 | Li[Ni$_{0.88}$Co$_{0.09}$Mn$_{0.03}$]O$_2$ | | | | Thioglycolic acid | 1.0 |
| Comparative Emmple 3-4 | Li[Ni$_{0.88}$Co$_{0.09}$Mn$_{0.03}$]O$_2$ | | | | 2,4-dithiopyrimidine | 1.0 |
| Comparative Example 3-5 | Li[Ni$_{0.88}$Co$_{0.09}$Mn$_{0.03}$]O$_2$ | | | | N,N-dithio Piperazine | 1.0 |
| Comparative Example 3-6 | Li[Ni$_{0.88}$Co$_{0.09}$Mn$_{0.03}$]O$_2$ | | | | tetrathioethylenediamine | 1.0 |
| Comparative Example 3-7 | Li[Ni$_{0.88}$Co$_{0.09}$Mn$_{0.03}$]O$_2$ | | | | trithiocyanuric acid | 1.0 |
| Comparative Emmple 3-8 | Li[Ni$_{0.88}$Co$_{0.09}$Mn$_{0.03}$]O$_2$ | | | | dimethyl dithioethylenediamine | 1.0 |
| Comparative Example 4-1 | Li[Ni$_{0.8}$Co$_{0.1}$Mn$_{0.1}$]O$_2$ | 0.5 | 0.06 | 0.2 | Tetraethylthiuram sulfide | 0.5 |
| Comparative Example 4-2 | Li[Ni$_{0.8}$Co$_{0.1}$Mn$_{0.1}$]O$_2$ | 0.5 | 0.06 | 0.2 | 2-thioethanol | 0.5 |
| Comparative Example 4-3 | Li[Ni$_{0.8}$Co$_{0.1}$Mn$_{0.1}$]O$_2$ | 0.5 | 0.06 | 0.2 | Thioglycolic acid | 0.5 |
| Comparative Example 4-4 | Li[Ni$_{0.8}$Co$_{0.1}$Mn$_{0.1}$]O$_2$ | 0.5 | 0.06 | 0.2 | 2,5-dimercapto-1,3,4-thiadiazole | 0.5 |
| Comparative Example 4-5 | Li[Ni$_{0.8}$Co$_{0.1}$Mn$_{0.1}$]O$_2$ | 0.5 | 0.06 | 0.2 | 2,4-dithiopyrimidine | 0.5 |
| Comparative Example 4-6 | Li[Ni$_{0.8}$Co$_{0.1}$Mn$_{0.1}$]O$_2$ | 0.5 | 0.06 | 0.2 | N,N-dithio Piperazine | 0.5 |
| Comparative Example 4-7 | Li[Ni$_{0.8}$Co$_{0.1}$Mn$_{0.1}$]O$_2$ | 0.5 | 0.06 | 0.2 | tetrathioethylenediatnine | 0.5 |
| Comparative Example 4-8 | Li[Ni$_{0.8}$Co$_{0.1}$Mn$_{0.1}$]O$_2$ | 0.5 | 0.06 | 0.2 | tritidocyanuric acid | 0.5 |
| Comparative Example 4-9 | Li[Ni$_{0.8}$Co$_{0.1}$Mn$_{0.1}$]O$_2$ | 0.5 | 0.06 | 0.2 | dimethyl dithioethylenediamine | 0.5 |

Experimental Example (1) Measurement of Lithium Salt Impurities 5.0 g of each lithium nickel oxide according to Examples and Comparative Examples was quantified in a 250 mL flask with 100 g of deionized water, and then a magnetic bar was put and stirred for 10 minutes at a rate of 4 rpm. The mixture was filtered using a pressure reducing flask and 50 g of the mixture was collected. The collected mixture was automatically titrated with 0.1N HCl in an auto titrator by Wader Method to measure amounts (wt %) of LiOH and Li$_2$CO$_3$.

(2) Evaluation of Battery Properties 2-1) Fabrication of Secondary Battery Cell

Each lithium nickel oxide of Examples and Comparative Examples, carbon black as a conductive additive and PVDF as a binder were mixed by a weight ratio of 92:5:3 to form a slurry. The slurry was uniformly coated on an aluminum foil having a thickness of 15 μm and vacuum-dried at 130° C. to form a cathode for a lithium secondary battery. An electrode assembly was formed using the cathode, a lithium foil as a counter electrode, a porous polyethylene layer (thickness: 21 μm) as a separator. A battery cell having a coin half-cell shape was fabricated by a commonly known process using the electrode assembly and an electrolyte solution in which 1.0 M of LiPF$_6$ was dissolved in a solution including ethylene carbonate and ethyl methyl carbonate by a volume ratio of 3:7.

2-2) Measurement of Initial Charging/Discharging Capacity

One cycle of a charging (CC/CV 0.1C 4.3V 0.05CA CUT-OFF) and a discharging (CC 0.1C 3.0V CUT-OFF) was performed using the battery cells of Examples and Comparative Examples, and initial charging and discharging capacities were measured (CC: constant current, CV: Constant voltage)

2-3) Measurement of Initial Efficiency

The initial discharging capacity was denominated by the initial charging capacity to measure an initial efficiency as a percentage value.

2-4) Measurement of Capacity Retention Ratio 300 cycles of the charging (CC/CV 0.5C 4.3V 0.05CA CUT-OFF) and discharging (CC 1.0C 3.0V CUT-OFF) were repeatedly performed using the battery cells of Examples and Comparative Examples. A discharging capacity at the 300th cycle was denominated by the discharging capacity at the first cycle to measure a capacity retention ratio as a percentage value.

The results are shown in Table 2 below.

TABLE 2

|  | LiOH (wt %) | Li$_2$CO$_3$ (wt %) | Initial Charging Capacity (mAh/g) | Initial Discharging Capacity (mAh/g) | Initial Efficiency (%) | Capacity Retention Ratio (300th cycle) (%) |
|---|---|---|---|---|---|---|
| Example 1-1 | 0.177 | 0.187 | 140 | 215 | 89 | 59 |
| Example 1-2 | 0.134 | 0.160 | 248 | 208 | 84 | 56 |
| Example 1-3 | 0.154 | 0.169 | 240 | 212 | 88 | 66 |
| Example 2-1 | 0.151 | 0.164 | 239 | 212 | 88 | 56 |
| Example 2-2 | 0.239 | 0.170 | 243 | 214 | 88 | 58 |
| Example 2-3 | 0.177 | 0.187 | 238 | 214 | 90 | 58 |
| Example 2-4 | 0.204 | 0.157 | 235 | 213 | 91 | 68 |
| Example 2-5 | 0.179 | 0.170 | 236 | 211 | 89 | 60 |
| Example 3-1 | 0.148 | 0.190 | 241 | 215 | 89 | 63 |
| Example 3-2 | 0.144 | 0.185 | 244 | 209 | 86 | 61 |
| Example 3-3 | 0.181 | 0.149 | 242 | 216 | 89 | 69 |
| Example 4-1 | 0.150 | 0.195 | 247 | 209 | 85 | 62 |
| Example 4-2 | 0.099 | 0.192 | 242 | 215 | 88 | 70 |
| Example 4-3 | 0.103 | 0.171 | 243 | 214 | 88 | 65 |
| Example 4-4 | 0.134 | 0.160 | 240 | 210 | 88 | 60 |
| Example 4-5 | 0.153 | 0.173 | 241 | 216 | 90 | 66 |
| Example 5-1 | 0.219 | 0.226 | 221 | 197 | 89 | 69 |
| Example 5-2 | 0.165 | 0.229 | 219 | 198 | 91 | 70 |
| Example 5-3 | 0.190 | 0.130 | 219 | 199 | 91 | 73 |
| Example 5-4 | 0.183 | 0.221 | 220 | 198 | 90 | 74 |
| Example 6-1 | 0.188 | 0.194 | 222 | 198 | 89 | 72 |
| Example 6-2 | 0.196 | 0.199 | 221 | 199 | 90 | 69 |
| Example 6-3 | 0.201 | 0.216 | 222 | 198 | 89 | 65 |
| Example 6-4 | 0.175 | 0.189 | 221 | 199 | 90 | 63 |
| Example 6-5 | 0.166 | 0.206 | 220 | 198 | 90 | 70 |
| Example 6-6 | 0.078 | 0.243 | 214 | 199 | 89 | 64 |
| Comparative Example 1 | 0.121 | 0.192 | 243 | 211 | 87 | 28 |
| Comparative Example 2 | 0.111 | 0.198 | 228 | 201 | 88 | 33 |
| Comparative Example 3-1 | 0.211 | 0.183 | 240 | 210 | 88 | 47 |
| Comparative Example 3-2 | 0.187 | 0.202 | 241 | 209 | 87 | 47 |
| Comparative Example 3-3 | 0.163 | 0.199 | 240 | 211 | 88 | 53 |
| Comparative Example 3-4 | 0.202 | 0.217 | 242 | 213 | 88 | 45 |
| Comparative Example 3-5 | 0.239 | 0.170 | 241 | 212 | 88 | 45 |
| Comparative Example 3-6 | 0.190 | 0.235 | 240 | 208 | 87 | 42 |
| Comparative Example 3-7 | 0.301 | 0.198 | 240 | 207 | 86 | 44 |
| Comparative Example 3-8 | 0.101 | 0.354 | 239 | 205 | 86 | 43 |
| Comparative Example 4-1 | 0.211 | 0.256 | 222 | 195 | 88 | 52 |
| Comparative Example 4-2 | 0.119 | 0.185 | 222 | 195 | 88 | 47 |
| Comparative Example 4-3 | 0.102 | 0.162 | 221 | 199 | 90 | 53 |
| Comparative Example 4-4 | 0.145 | 0.211 | 223 | 198 | 89 | 62 |
| Comparative Example 4-5 | 0.201 | 0.232 | 220 | 198 | 90 | 53 |
| Comparative Example 4-6 | 0.224 | 0.236 | 221 | 197 | 89 | 52 |
| Comparative Example 4-7 | 0.237 | 0.193 | 222 | 198 | 89 | 54 |
| Comparative Example 4-8 | 0.179 | 0.215 | 221 | 197 | 89 | 53 |
| Comparative Example 4-9 | 0.123 | 0.244 | 223 | 199 | 90 | 55 |

Referring to Table 2 above, amounts of the lithium salt impurities in Examples using water and the organic ligand multimer compounds were similar to those in Comparative Examples 1 and 2 only using water. Thus, sufficient washing capability was achieved by an addition of the organic ligand multimer compounds.

Further, capacity retention ratios in Examples 1 and 2 were explicitly greater than that measured in Comparative Example 1. Thus, a surface structure of the lithium metal oxide was prevented by the organic ligand multimer compounds to improve a life-span of the battery.

Capacity retention ratios in Examples 3 to 6 including the metal oxide coating on the surface of the lithium metal oxide were greater than those in Examples 1 and 2, and thus the life-span of the battery was improved by the metal oxide coating.

As shown in Examples 3-2 and 3-3 and Example 4, similar washing and surface protection properties were obtained by a weight ratio of the organic ligand dimer in a range from about 0.1 part by weight to about 1.0 part by weight relative to 1 part by weight of LiOH.

As shown in Example 2-1 (2,4-dithiopyrimidine polymer), Example 2-4 (trithiocyanuric acid polymer) and Example 5-4 (2,5-dimercapto-1,3,4-thiadiazole Dimmer), the life-span of the battery was further improved when the organic ligand multimer compound included a heteroaryl group or a heteroally group.

In Examples 5 and 6 using Li[Ni$_{0.8}$Co$_{0.1}$Mn$_{0.1}$]O$_2$ as the lithium metal oxide, the amounts of the lithium salt impurities were increased when compared to those in Examples 1 and 2. However, the capacity retention ratios were further improved. The amounts of the lithium salt impurities in Examples 5 and 6 were slightly smaller than that in Comparative Example 2. However, the capacity retention ratios were drastically increased.

Thus, the surface structure was stably protected while maintaining proper washing capability of the lithium salt impurities when the washing solution including water and the organic ligand polymer or dimer was used.

Additionally, removal of the lithium salt impurities and capacity retention ratios in Examples 1, 2, 5 and 6 were greater than those in Comparative Examples 3 and 4 using the organic ligand monomers.

(3) TEM Image Evaluation

Internal particle structures of Examples 3-3, Comparative Example 1 and Comparative Example 3-3 were evaluated via TEM images using Tecnai G2 F30 (manufacture by FEI). The images are shown in FIG. 4 (Example 3-3), FIG. 5 (Comparative Example 1) and FIG. 6 (Comparative Example 3-3)

Figure 4:
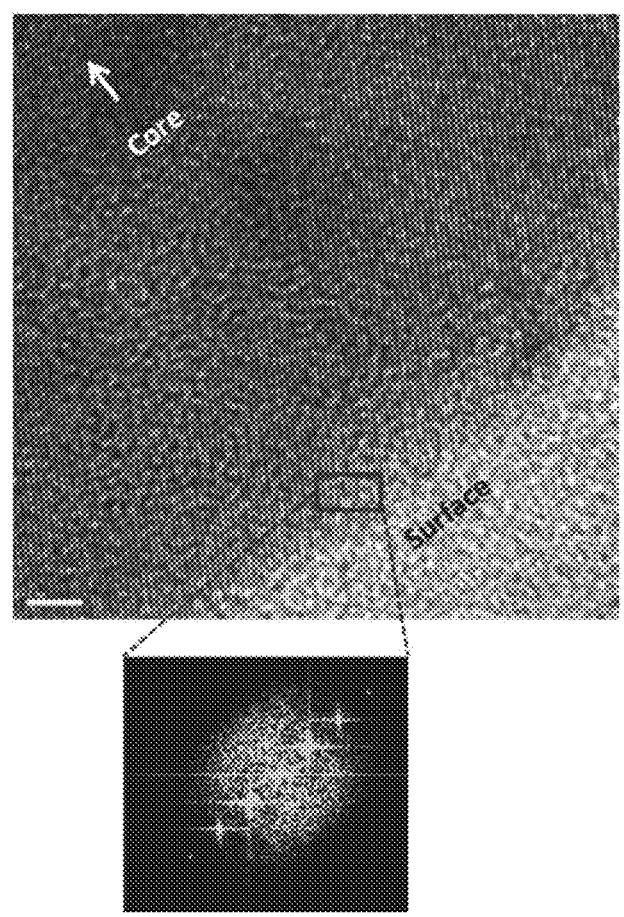
FIG. 4 is a TEM image showing a lithium metal oxide of Example 3-3.
Figure 5:
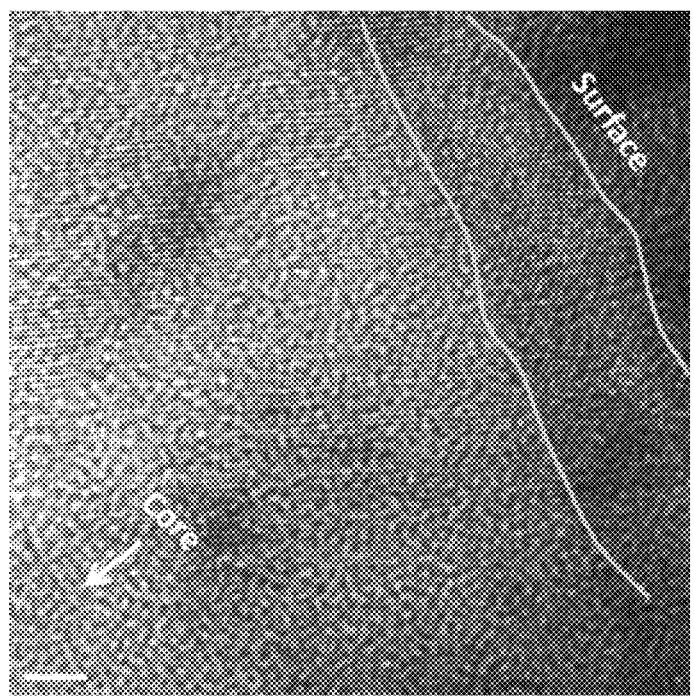
FIG. 5 is a TEM image showing a lithium metal oxide of Comparative Example 1.
Figure 6:
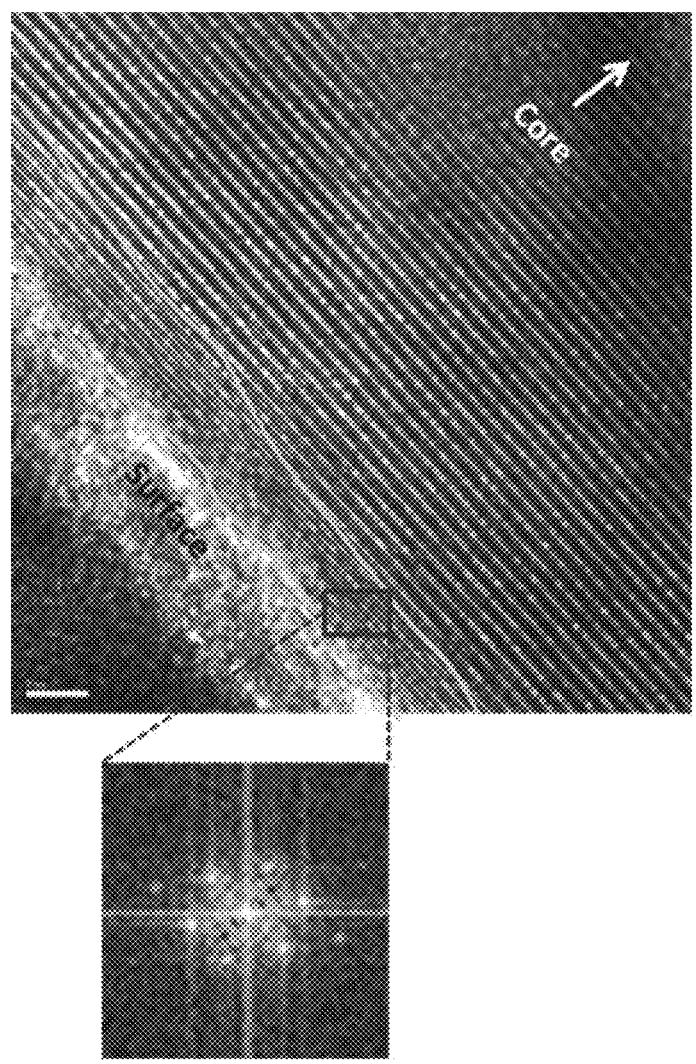
FIG. 6 is a TEM image showing a lithium metal oxide of Comparative Example 3-3.

As shown in FIGS. 4 to 6, the layered-structures in Example 3-3 and Comparative Example 3-3 were more stabilized than that in Comparative Example 1. Thus, it is evidenced that the organic ligand compound protected the surface structure of the lithium metal oxide.

Further, the layered-structure in Example 3-3 was more stabilized than that in Comparative Example 3-3. Thus, it is evidenced that the organic ligand dimer or polymer protected the surface structure of the lithium metal oxide more efficiently than the organic ligand monomer.

What is claimed is:
1. A method of preparing a lithium metal oxide, comprising:
preparing a preliminary lithium metal oxide; and
washing the preliminary lithium metal oxide using a washing solution to remove lithium salt impurities, the washing solution including water and an organic ligand multimer compound wherein the organic ligand multimer compound includes at least one element having at least one unshared electron pair.

2. The method according to claim 1, wherein the element having the unshared electron pair forms a coordination bond or an ionic bond with lithium or a metal element except for lithium of the preliminary lithium metal oxide.

3. The method according to claim 1, wherein the organic ligand multimer compound includes at least two different elements having the unshared electron pair.

4. The method according to claim 3, wherein the organic ligand multimer compound includes sulfur (S) and oxygen (O), or includes sulfur (S) and nitrogen (N).

5. The method according to claim 1, wherein the organic ligand multimer compound includes at least one of a heteroaryl group or a heteroallyl group.

6. The method according to claim 1, wherein an amount of the organic ligand multimer compound is in a range from 0.05 part by weight to 2.5 parts by weight based on 1 part by weight of LiOH in the lithium salt impurities.

7. The method according to claim 1, wherein a remaining amount of the organic ligand multimer compound is in a range from 0.0005 wt % to 0.5 wt % based on a weight of the lithium metal oxide.

8. The method according to claim 1, wherein the lithium metal oxide is represented by Chemical Formula 1:

$$Li_{1+a}Ni_{1-(x+y)}Co_xM_yO_2 \qquad \text{[Chemical Formula 1]}$$

wherein, in Chemical Formula 1, $-0.05 \leq a \leq 0.15$, $0.01 \leq x \leq 0.2$, $0 \leq y \leq 0.2$, and M is at least one selected from Mg, Sr, Ba, B, Al, Si, Mn, Ti, Zr or W.

9. The method according to claim 8, wherein the lithium metal oxide includes a metal oxide coating formed on at least a portion of a surface thereof.

10. A method of manufacturing a lithium secondary battery, comprising:

forming a cathode active material including the lithium metal oxide prepared according to claim 1;

coating the cathode active material on a cathode current collector to from a cathode; and forming an anode facing the cathode with respect to a separation layer.

* * * * *